(12) United States Patent
Kinnebrew et al.

(10) Patent No.: US 9,977,492 B2
(45) Date of Patent: May 22, 2018

(54) MIXED REALITY PRESENTATION

(71) Applicant: Microsoft Technology Licensing, LLC, Redmond, WA (US)

(72) Inventors: Peter Tobias Kinnebrew, Seattle, WA (US); Alex Kipman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 126 days.

(21) Appl. No.: 13/706,814

(22) Filed: Dec. 6, 2012

(65) Prior Publication Data
US 2014/0160001 A1    Jun. 12, 2014

(51) Int. Cl.
*G06T 19/00* (2011.01)
*G06F 3/01* (2006.01)
*G06F 3/0482* (2013.01)

(52) U.S. Cl.
CPC .............. *G06F 3/011* (2013.01); *G06F 3/012* (2013.01); *G06F 3/013* (2013.01); *G06F 3/017* (2013.01); *G06F 3/0482* (2013.01)

(58) Field of Classification Search
CPC .......... G06F 3/011; G06F 3/012; G06F 3/013; G06F 3/01; G06F 3/041; G06F 3/033; G06F 3/048; G09G 5/00; G09G 5/377; G06T 19/00; G06T 15/00; H04N 7/18; H04N 5/228; G06K 9/00; A61B 3/10; A61B 3/14; A61B 5/05; A61B 5/0476; A61B 6/00; G10L 21/00; G02B 27/01; G02B 27/14

USPC ........................................................ 345/633
See application file for complete search history.

(56) References Cited

U.S. PATENT DOCUMENTS 5,471,542 A * 11/1995 Ragland ........................ 382/128
5,689,619 A * 11/1997 Smyth ............................. 706/45
7,564,469 B2    7/2009 Cohen
7,755,608 B2    7/2010 Chang et al.
(Continued)

OTHER PUBLICATIONS

Belcher, et al., "MxR A Physical Model-Based Mixed Reality Interface for Design Collaboration, Simulation, Visualization and Form Generation", Retrieved at <<http://dmg.be.washington.edu/pdfs/Mxr(Acadia08,Blecher,%20Johnson).pdf>>, Proceedings of the Association for Computer Aided Design in Architecture, Oct. 19, 2008, pp. 8.
(Continued)

*Primary Examiner* — Ilana Spar
*Assistant Examiner* — Nguyen H Truong
(74) *Attorney, Agent, or Firm* — Alleman Hall Creasman & Tuttle LLP (57) ABSTRACT

Embodiments that relate to presenting a mixed reality environment via a mixed reality display device are disclosed. For example, one disclosed embodiment provides a method for presenting a mixed reality environment via a head-mounted display device. The method includes using head pose data to generally identify one or more gross selectable targets within a sub-region of a spatial region occupied by the mixed reality environment. The method further includes specifically identifying a fine selectable target from among the gross selectable targets based on eye-tracking data. Gesture data is then used to identify a gesture, and an operation associated with the identified gesture is performed on the fine selectable target.

16 Claims, 6 Drawing Sheets

(56) References Cited

U.S. PATENT DOCUMENTS

| | | | |
|---|---|---|---|
| 8,682,919 B1* | 3/2014 | Golliher | 707/769 |
| 2005/0047629 A1 | 3/2005 | Farrell et al. | |
| 2006/0028400 A1 | 2/2006 | Lapstun et al. | |
| 2009/0027337 A1* | 1/2009 | Hildreth | 345/158 |
| 2012/0086645 A1* | 4/2012 | Zheng et al. | 345/168 |
| 2012/0236025 A1* | 9/2012 | Jacobsen et al. | 345/629 |
| 2012/0262558 A1 | 10/2012 | Boger et al. | |
| 2012/0272179 A1* | 10/2012 | Stafford | 715/781 |
| 2013/0007672 A1* | 1/2013 | Taubman | G06F 3/012 715/863 |
| 2013/0016070 A1* | 1/2013 | Starner | G02B 27/017 345/175 |
| 2013/0162632 A1* | 6/2013 | Varga | G06T 19/006 345/419 |
| 2013/0335301 A1* | 12/2013 | Wong et al. | 345/8 |
| 2014/0092014 A1* | 4/2014 | Srinivasan | G06F 3/013 345/158 |

OTHER PUBLICATIONS

Yoshida, et al., "Various Tangible Devices Suitable for Mixed Reality Interactions", Retrieved at <<http://www.rm.is.ritsumei.ac.jp/~tamura/paper/yoshida[1].pdf>>, Proceedings of the 9th IEEE International Symposium on Mixed and Augmented Reality (ISMAR), Oct. 16, 2010, pp. 283-284.

Fidopiastis, et al., "Human Experience Modeler: Context Driven Cognitive Retraining and Narrative Threads", Retrieved at <<http://www.ist.ucf.edu/medical/IWVR05FidopiastisEtAl.pdf>>, Proceedings of the 4th International Workshop on Virtual Rehabilitation, Sep. 21, 2005, pp. 10.

Belimpasakis, et al., "A Combined Mixed Reality and Networked Home Approach to Improving User Interaction with Consumer Electronics", Retrieved at <<http://ieeexplore.ieee.org/stamp/stamp.jsp?arnumber=05735494>>, Proceedings of the IEEE Transactions on Consumer Electronics, vol. 57, No. 1, Feb. 2011, pp. 139-144.

Broll, et al., "An Infrastructure for Realizing Custom-Tailored Augmented Reality User Interfaces", Retrieved at <<http://lisweb.de/pdfs/broll05a.pdf>>, Proceedings of the IEEE Transactions on Visualization and Computer Graphics, vol. 11, No. 6, Dec. 2005, pp. 722-733.

ISA European Patent Office, International Search Report and Written Opinion of PCT/US2013/072684, WIPO, dated Feb. 28, 2014, 10 pages.

* cited by examiner

MIXED REALITY PRESENTATION

BACKGROUND

Mixed reality or augmented reality display devices, such as head-mounted display devices, may be used in a variety of real-world environments and contexts. Such devices provide a view of a physical environment that is augmented by a virtual environment including virtual images, such as two-dimensional virtual objects and three-dimensional holographic objects, and/or other virtual reality information. Such devices may also include various sensors for collecting data from the surrounding environment.

A mixed reality device may display virtual images that are interspersed with real-world physical objects to create a mixed reality environment. A user of the device may desire to interact with a virtual or physical object using the mixed reality device. However, the development of a simple and intuitive paradigm that provides for user engagement with such objects via mixed reality devices has proven elusive.

SUMMARY

Various embodiments are disclosed herein that relate to presenting a mixed reality environment via a mixed reality display device. For example, one disclosed embodiment provides a method for presenting a mixed reality environment via a head-mounted display device. The method includes using head pose data from the device to generally identify one or more gross selectable targets. The targets are identified within a sub-region of a spatial region occupied by the mixed reality environment. The method further includes specifically identifying a fine selectable target from among the gross selectable targets based on eye-tracking data from the device. Gesture data from the device is then used to identify a gesture, and an operation associated with the identified gesture is performed on the fine selectable target.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
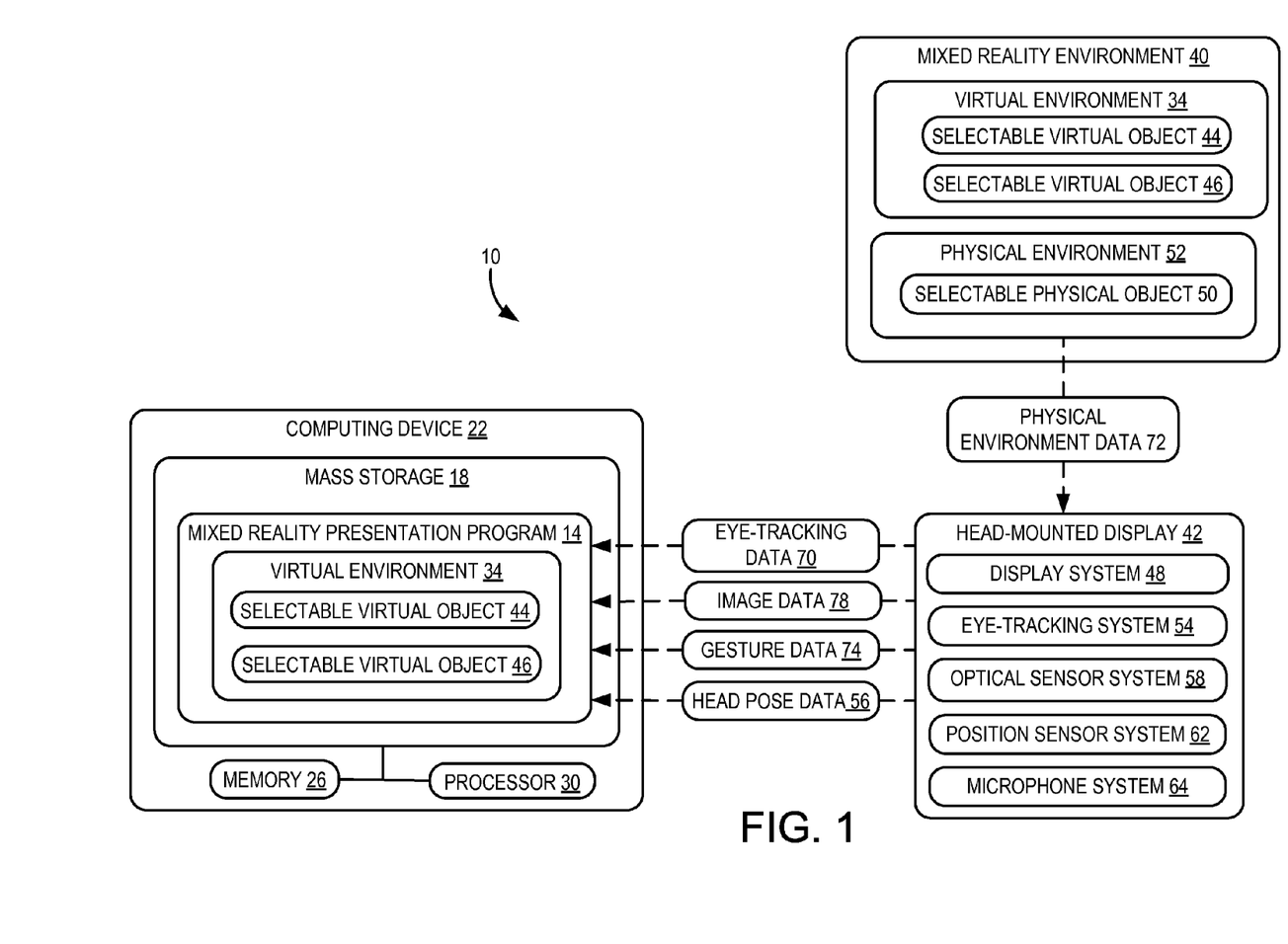
FIG. 1 is a schematic view of a mixed reality presentation system according to an embodiment of the present disclosure.

FIG. 1 shows a schematic view of one embodiment of a mixed reality presentation system 10. The mixed reality presentation system 10 includes a mixed reality presentation program 14 that may be stored in mass storage 18 of a computing device 22. The mixed reality presentation program 14 may be loaded into memory 26 and executed by a processor 30 of the computing device 22 to perform one or more of the methods and processes described in more detail below.

The mixed reality presentation program 14 may generate a virtual environment 34 for display on a display device, such as the head-mounted display (HMD) device 42, to create a mixed reality environment 40. The virtual environment 34 includes one or more virtual images, such as two-dimensional virtual objects and three-dimensional holographic objects. In the present example virtual environment 34 includes virtual objects in the form of selectable virtual object 44 and selectable virtual object 46. As described in more detail below with respect to FIG. 3, the selectable virtual objects 44 and 46 may correspond to gross selectable targets and/or fine selectable targets that are identified by the mixed reality presentation program 14 as being located within a sub-region of the mixed reality environment 40.

The computing device 22 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 22 are described in more detail below with reference to FIG. 9.

The computing device 22 may be operatively connected with the HMD device 42 using a wired connection, or may employ a wireless connection via WiFi, Bluetooth, or any other suitable wireless communication protocol. Additionally, the example illustrated in FIG. 1 shows the computing device 22 as a separate component from the HMD device 42. It will be appreciated that in other examples the computing device 22 may be integrated into the HMD device 42.

Figure 2:
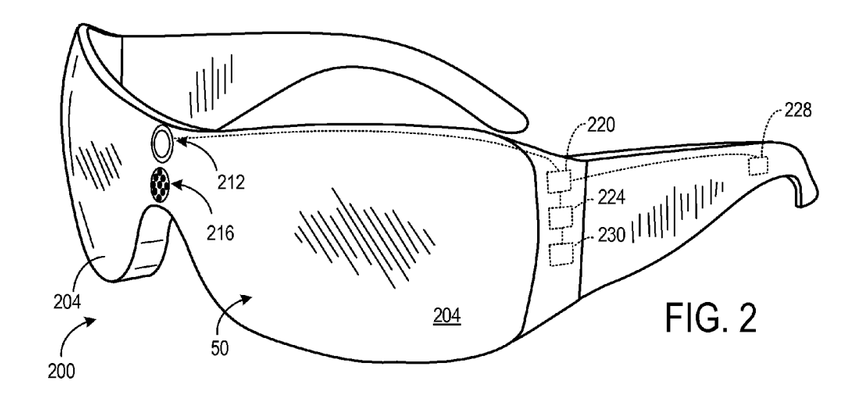
FIG. 2 shows an example head-mounted display device according to an embodiment of the present disclosure.

With reference now also to FIG. 2, one example of an HMD device 200 in the form of a pair of wearable glasses with a transparent display 50 is provided. It will be appreciated that in other examples, the HMD device 200 may take other suitable forms in which a transparent, semi-transparent or non-transparent display is supported in front of a viewer's eye or eyes. It will also be appreciated that the HMD device 42 shown in FIG. 1 may take the form of the HMD device 200, as described in more detail below, or any other suitable HMD device. Additionally, many other types and configurations of display devices having various form factors may also be used within the scope of the present disclosure. Such display devices may include, but are not limited to, smart phones, tablet computers, and other suitable display devices.

With reference to FIGS. 1 and 2, in this example the HMD device 42 includes a display system 48 and transparent display 50 that enables images to be delivered to the eyes of a user. The transparent display 50 may be configured to visually augment an appearance of a physical environment 52 to a user viewing the physical environment through the transparent display. For example, the appearance of the physical environment may be augmented by graphical content (e.g., one or more pixels each having a respective color and brightness) that is presented via the transparent display 50 to create a mixed reality environment 40.

The transparent display 50 may also be configured to enable a user to view a physical, real-world object in the physical environment 52 through one or more partially transparent pixels that are displaying a virtual object representation. In one example, the transparent display 50 may include image-producing elements located within lenses 204 (such as, for example, a see-through Organic Light-Emitting Diode (OLED) display). As another example, the transparent display 50 may include a light modulator on an edge of the lenses 204. In this example the lenses 204 may serve as a light guide for delivering light from the light modulator to the eyes of a user. Such a light guide may enable a user to perceive a 3D holographic image located within the physical environment that the user is viewing, while also allowing the user to view physical objects in the physical environment.

The HMD device 42 may also include various sensors and related systems. For example, the HMD device 42 may include an eye-tracking sensor system 54 that utilizes at least one inward facing sensor 216. The inward facing sensor 216 may be an image sensor that is configured to acquire image data in the form of eye-tracking information from a user's eyes. Provided the user has consented to the acquisition and use of this information, the eye-tracking sensor system 54 may use this information to track a position and/or movement of the user's eyes.

In one example, the eye-tracking system 54 includes a gaze detection subsystem configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes. Images of the glints and of the pupils as determined from image data gathered from the image sensors may be used to determine an optical axis of each eye. Using this information, the eye-tracking sensor system 54 may then determine a direction and/or at what physical object or virtual object the user is gazing. Such eye-tracking data 70 may then be provided to the mixed reality presentation program 14. It will be understood that the gaze detection subsystem may have any suitable number and arrangement of light sources and image sensors.

The HMD device 42 may also include sensor systems that receive physical environment data 72 from the physical environment 52. For example, the HMD device 42 may include an optical sensor system 58 that utilizes at least one outward facing sensor 212, such as an optical sensor. Outward facing sensor 212 may detect movements within its field of view, such as gesture-based inputs or other movements performed by a user or by a person or physical object within the field of view. Outward facing sensor 212 may also capture two-dimensional image information and depth information from a physical environment and physical objects within the environment. For example, outward facing sensor 212 may include a depth camera, a visible light camera, an infrared light camera, and/or a position tracking camera.

The HMD device 42 may include depth sensing via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

Outward facing sensor 212 may capture images of physical environment 52 in which a user is situated. As discussed in more detail below, such images may be part of the physical environment data 72 that is received by the HMD device 42 and provided to the computing device 22. In one example, the mixed reality presentation program 14 may include a 3D modeling system that uses such input to generate the virtual environment 34 that models the physical environment data 72 that is captured.

The HMD device 42 may also include a position sensor system 62 that utilizes one or more motion sensors 224 to enable position tracking and/or orientation sensing of the HMD device. For example, the position sensor system 62 may be utilized to determine a head pose orientation of a user's head. In one example, position sensor system 62 may comprise an inertial measurement unit configured as a six-axis or six-degree of freedom position sensor system. This example position sensor system may, for example, include three accelerometers and three gyroscopes to indicate or measure a change in location of the HMD device 42 within three-dimensional space along three orthogonal axes (e.g., x, y, z), and a change in an orientation of the HMD device about the three orthogonal axes (e.g., roll, pitch, yaw).

As described in more detail below, such head pose data may be used to determine the boundaries of a sub-region within the spatial region occupied by the mixed reality environment 40. Position sensor system 62 may also support other suitable positioning techniques, such as GPS or other global navigation systems. Further, while specific examples of position sensor systems have been described, it will be appreciated that other suitable position sensor systems may be used.

In some examples, motion sensors 224 may also be employed as user input devices, such that a user may interact with the HMD device 42 via gestures of the neck and head, or even of the body. The HMD device 42 may also include a microphone system 64 that includes one or more microphones 220. In other examples, audio may be presented to the user via one or more speakers 228 on the HMD device 42.

The HMD device 42 may also include a processor 230 having a logic subsystem and a storage subsystem, as discussed in more detail below with respect to FIG. 9, that are in communication with the various sensors and systems of the HMD device. In one example, the storage subsystem may include instructions that are executable by the logic subsystem to receive signal inputs from the sensors and forward such inputs to computing device 22 (in unprocessed or processed form), and to present images to a user via the transparent display 50.

It will be appreciated that the HMD device 42 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the HMD device 42 may include additional and/or alternative sensors, cameras, microphones, input devices, output devices, etc. without departing from the scope of this disclosure. Further, the physical configuration of the HMD device 42 and its various sensors and subcomponents may take a variety of different forms without departing from the scope of this disclosure.

Figure 3:
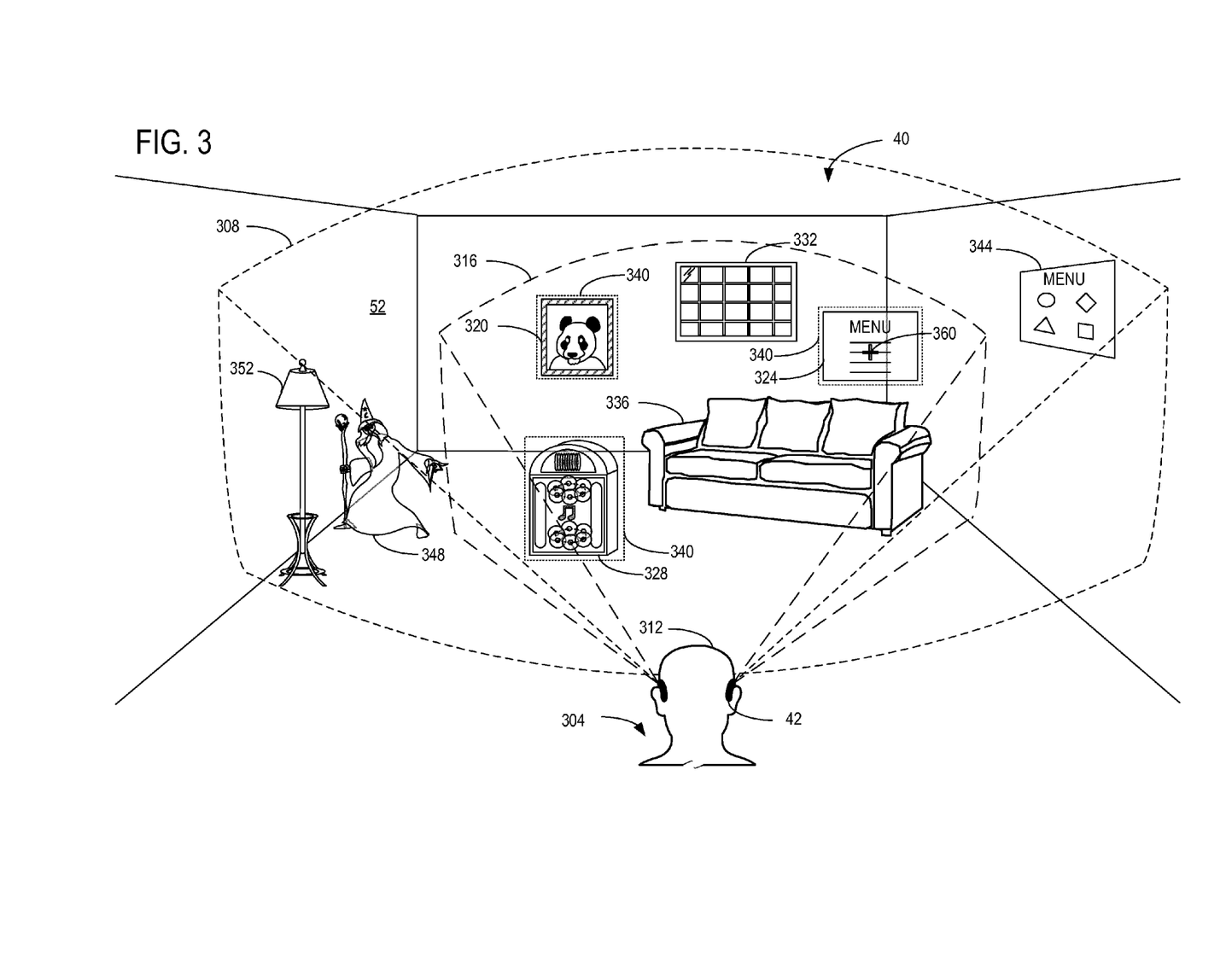
FIG. 3 is a schematic view of a user wearing the head-mounted display device of FIG. 2 and viewing an example mixed reality environment.

With reference now to FIG. 3, descriptions of example use cases and embodiments of the mixed reality presentation system 10 will now be provided. FIG. 3 is a schematic illustration of a user 304 wearing HMD device 42 and viewing through the device a physical environment 52 in the form of a living room. In this example the HMD device 42 takes the form of HMD device 200.

As viewed by the user 304, the physical environment 52 combines with the virtual environment 34 to create the mixed reality environment 40 in the living room. As shown in FIG. 3, the mixed reality environment 40 occupies a spatial region 308 of the physical environment 52 that represents a portion of the living room viewable through the HMD device 42, and thus the portion of the living room that may be augmented with virtual images displayed via the HMD device 42. In some embodiments, the spatial region 308 may be substantially coextensive with the user's actual field of vision, while in other embodiments the spatial region 308 may occupy a lesser portion of the user's actual field of vision.

Using head pose data 56 received from the position sensor system 62, the mixed reality presentation program 14 determines an orientation of the user's head 312 with respect to the physical environment 52 and spatial region 308. The mixed reality presentation program 14 then defines a sub-region 316 within the spatial region 308 that corresponds generally to the direction the user 304 is facing. Given that the user 304 is facing the sub-region 316, this sub-region may correspond to the portion of the spatial region 308 in which the user 304 is currently interested. It also follows that the user's attention may be focused on one or more physical and/or virtual objects in sub-region 316. As shown in FIG. 3, sub-region 316 occupies a smaller volume of the physical environment 52 than spatial region 308. It will also be appreciated that the sub-region 316 may have any suitable shape that captures a portion of the spatial region 308 toward which the user 304 is generally facing.

One or more of the physical and/or virtual objects in sub-region 316 may be selectable by the user 304 via the HMD device 42. Accordingly, the mixed reality presentation program 14 may be configured to generally identify the selectable objects within the sub-region 316, whether virtual or physical, as gross selectable targets.

In this example, the gross selectable targets include a selectable physical object in the form of framed picture 320. In other examples two or more selectable physical objects may be identified within a sub-region. The gross selectable targets also include selectable virtual objects in the form of the two-dimensional virtual menu 324 and the three-dimensional holographic jukebox 328. Other virtual and/or physical objects within sub-region 316, such as window 332 and couch 336, may not be selectable. For purposes of this disclosure, "selectable" means that one or more operations may be performed on the object. Examples of such operations include, but are not limited to, launching an application via the object, displaying a menu of operations and/or other actions related to the object, performing word processing operations related to the object, searching operations, browsing operations, image capture operations, altering the display of the object, etc.

To provide feedback to the user 304 that the gross selectable targets are selectable, each of the framed picture 320, virtual menu 324 and holographic jukebox 328 are displayed with a gross visual highlight. In one example, the gross visual highlight may comprise a colored halo that encircles each of the objects, such as a green halo 340. It will be appreciated that any other suitable visual highlight may be used to provide such feedback within the scope of the present disclosure. It will also be appreciated that objects within the spatial region 308 but outside of the sub-region 316, such as the virtual menu 344 and holographic wizard 348, are also visible to the user 304 but are not presented with a gross visual highlight.

It will also be appreciated that as the user's head 312 moves, the spatial region 308 and sub-region 316 correspondingly move and may capture other objects within their fields of view. For example, as the user's head 312 rotates to the left, the sub-region 316 may capture the holographic wizard 348 and the physical lamp 352. In one example where the holographic wizard 348 is a selectable virtual object, as the left boundary of the sub-region 316 passes over the wizard, the wizard is displayed with a gross visual highlight. Similarly, when the sub-region 316 no longer captures a selectable object, the gross visual highlight for that object is not displayed.

Using eye-tracking data 70, the mixed reality presentation program 14 may more specifically identify a fine selectable target from among the gross selectable targets at which the user 304 is gazing. In the present example and with reference also to FIG. 4, the mixed reality presentation program 14 may use eye-tracking data 70 to identify a focal point 360 of the user's gaze. Using the focal point 360, the mixed reality presentation program 14 may determine that the user is gazing at the PLAY item on the virtual menu 324. The focal point 360 may not be visible to the user 304.

Figure 4:
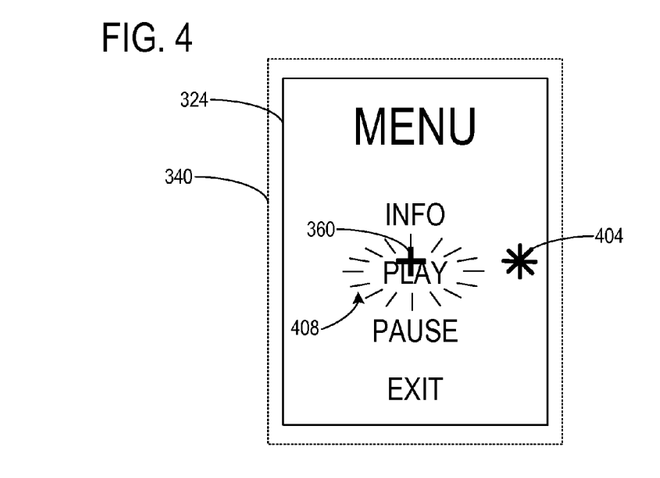
FIG. 4 is a schematic illustration of a gross selectable target and a fine selectable target from the mixed reality environment of FIG. 3.

In this example, the PLAY item comprises a sub-target within the gross selectable target of the virtual menu 324. It will be appreciated that in other examples, a gross selectable target may not include a sub-target, in which case the gross selectable target may also be identified as the fine selectable target.

As shown in FIG. 4, an eye-tracking visual cue 404 may also be displayed to provide the user 304 with visual feedback regarding the location of the user's gaze within the spatial region 308. The eye-tracking visual cue 404 may take the form of an asterisk, as shown, or any other suitable visual cue that corresponds generally to the location of the user's gaze. In the present example, the eye-tracking visual cue 404 is displayed at a horizontal distance from the focal point 360 to avoid obscuring the PLAY selection image. It will be appreciated that other positionings of the eye-tracking visual cue 404 relative to the focal point 360 may also be used.

Upon identifying the fine selectable target, the mixed reality presentation program 14 displays the fine selectable target with a fine visual highlight that is different from the gross visual highlight. In the present example, the PLAY item may be displayed with a red halo 408 that contrasts with the larger green halo 340 encircling the menu 324. In this manner, the user 304 receives visual feedback indicating that the PLAY item is targeted and available for selection. It will be appreciated that any other fine visual highlight that provides a visual distinction from the gross visual highlight may also be used and is within the scope of the present disclosure.

Figure 6:
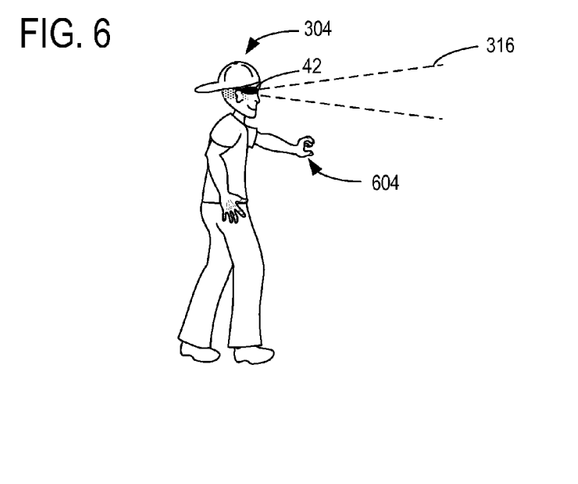
FIGS. 6 and 7 show a user performing a gesture.
Figure 7:
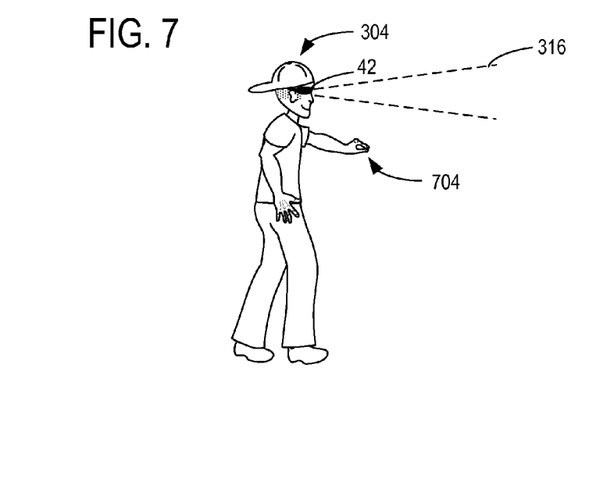

With reference now also to FIGS. 6 and 7, the user 304 may then perform a gesture that causes the mixed reality presentation program 14 to perform an operation on the PLAY item. As shown in FIGS. 6 and 7, in one example the gesture comprises the user 304 forming a "C" shape 604 with the user's four fingers and thumb, and bringing the fingers and thumb together to close the shape, as indicated at 704. The user's arm is bent at the elbow to extend the user's hand slightly forward. This position combined with the simple open/closed "C" gesture provides a comfortable and natural motion for the user 304 to perform in selecting the PLAY item.

As shown in FIGS. 6 and 7, in this example the illustrated gesture is performed below and outside of the sub-region 316. However, it will be appreciated that the gesture is performed within a field of view of the outward facing sensor 212. In this manner, depth information corresponding to the gesture target, in this case the user's hand, is received by the outward facing sensor 212 and provided as gesture data 74 to the mixed reality presentation program 14. The gesture is then identified by the mixed reality presentation program 14 based on the gesture data 74, and an operation associated with the gesture is performed on the PLAY item. In other examples, the gesture may be performed within the boundaries of the sub-region 316.

In the present example, the operation performed on the PLAY item may comprise selecting the PLAY item to start playback of a holographic movie. As noted above, any other operation that is associated with the identified gesture may be performed on the fine selectable target that is identified. It will also be appreciated that fine selectable targets may include physical objects, such as the framed picture 320. For example, an operation such as capturing an image of the framed picture 320 may be performed.

Figure 5:
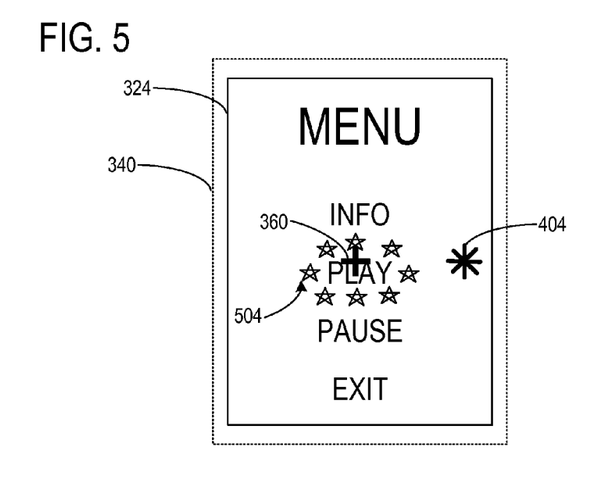
FIG. 5 is a schematic illustration of the gross selectable target and fine selectable target of FIG. 4 with different visual highlighting.

In the present example and with reference again to FIGS. 4 and 5, upon selecting the PLAY item the fine visual highlight in the form of the red halo 408 encircling the PLAY item is changed to an activated visual highlight in the form of a moving halo of stars 504. In this manner, the user 304 is provided with visual feedback that the PLAY item has been selected. It will be appreciated that any other activated visual highlight that provides a visual distinction from the fine visual highlight may also be used and is within the scope of the present disclosure.

Figure 8A:
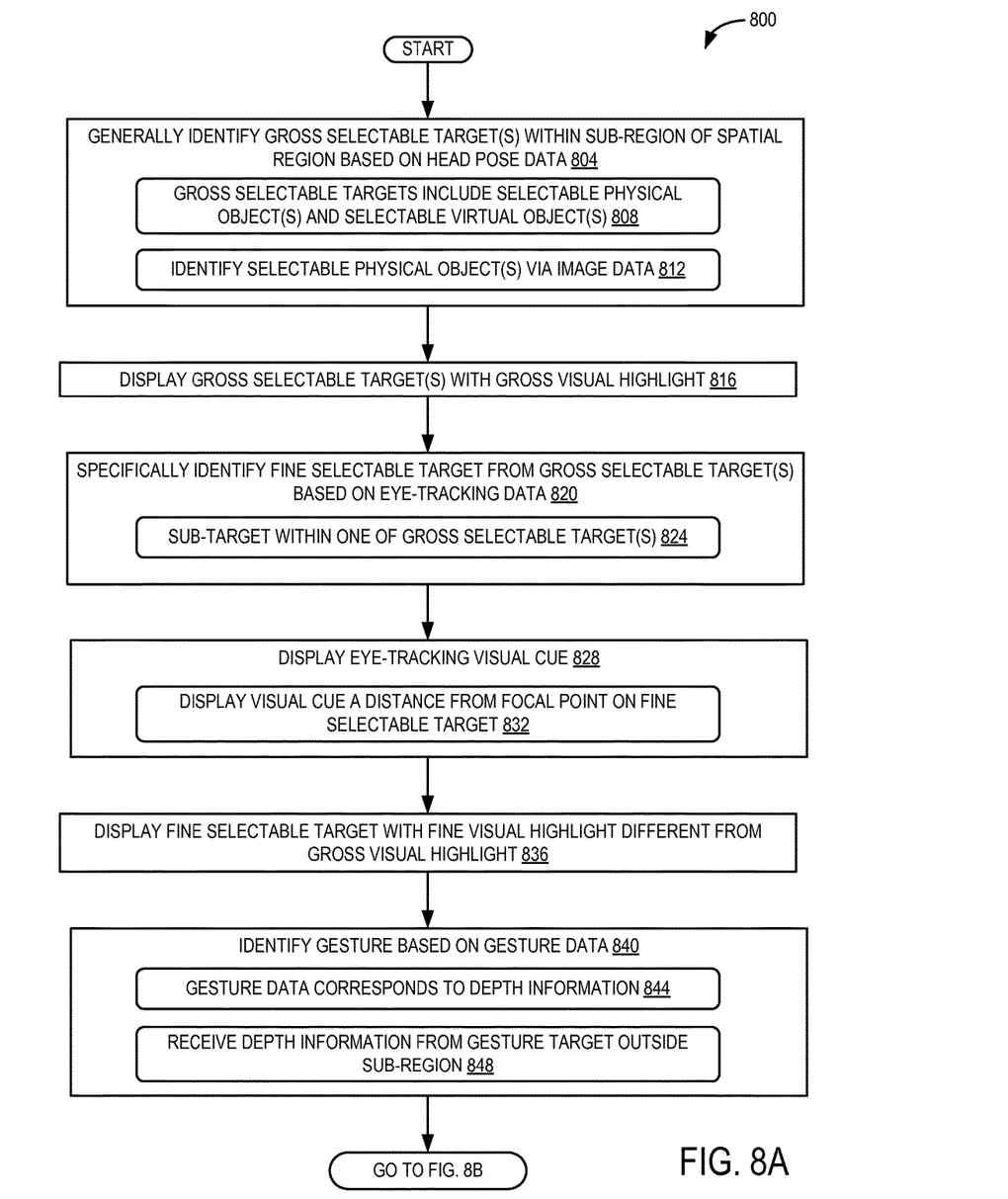
FIGS. 8A and 8B are a flow chart of a method for presenting a mixed reality environment according to an embodiment of the present disclosure.
Figure 8B:
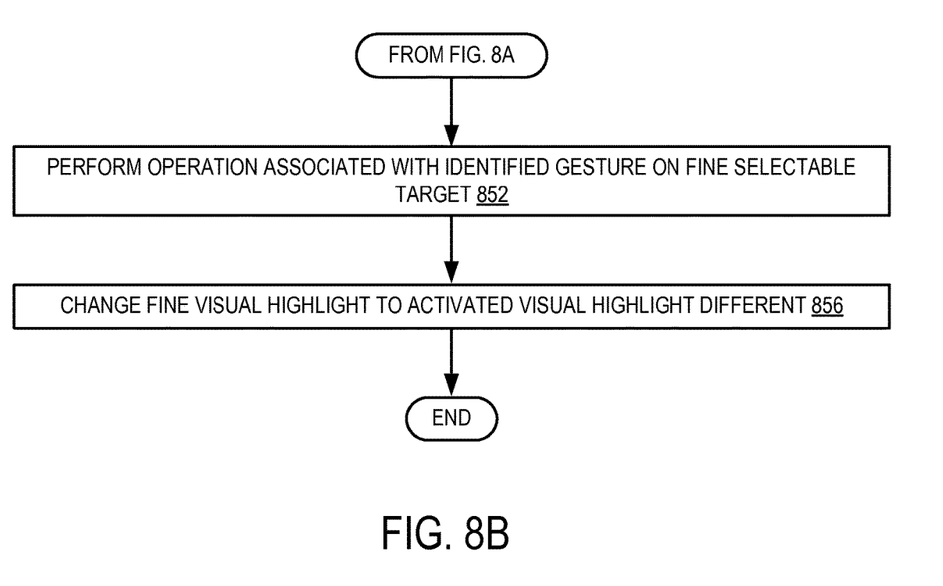

FIGS. 8A and 8B illustrate a flow chart of a method 800 for presenting a mixed reality environment according to an embodiment of the present disclosure. The following description of method 800 is provided with reference to the software and hardware components of the mixed reality presentation system 10 described above and shown in FIGS. 1-7. It will be appreciated that method 800 may also be performed in other contexts using other suitable hardware and software components.

With reference to FIG. 8A, at 804 the method 800 includes generally identifying one or more gross selectable targets within a sub-region 316 of the spatial region 308 occupied by the mixed reality environment 40. The gross selectable targets are identified based on head pose data 56 from one or more of the sensors of the HMD device 42. As indicated at 808, the gross selectable targets may include one or more selectable physical objects and one or more selectable virtual objects within the mixed reality environment 40. At 812, the selectable physical objects may be identified via image data 78 from one or more of the sensors.

At 816 the method 800 includes displaying the one or more gross selectable targets with a gross visual highlight. At 820 the method 800 includes specifically identifying a fine selectable target from among the one or more gross selectable targets based on eye-tracking data 70 from one or more of the sensors. In one example indicated at 824, the fine selectable target may comprise a sub-target within one of the one or more gross selectable targets. At 828 the method 800 includes displaying an eye-tracking visual cue 404 based on eye-tracking data 70. In one example indicated at 832, the eye-tracking visual cue 404 is displayed at a distance from a focal point 360 on the fine selectable target.

At 836 the method 800 includes displaying the fine selectable target with a fine visual highlight that is different from the gross visual highlight. At 840 a gesture is identified based on gesture data 74 from one or more of the sensors. As indicated at 844, the gesture data corresponds to depth information. At 848 the depth information may be received from a gesture target that is outside the sub-region 316. With reference now to FIG. 8B, at 852 the method 800 includes performing an operation associated with the identified gesture on the fine selectable target. At 856, upon performing the operation the fine visual highlight is changed to an activated visual highlight that is different from the fine visual highlight.

It will be appreciated that method 800 is provided by way of example and is not meant to be limiting. Therefore, it is to be understood that method 800 may include additional and/or alternative steps than those illustrated in FIGS. 8A and 8B. Further, it is to be understood that method 800 may be performed in any suitable order. Further still, it is to be understood that one or more steps may be omitted from method 800 without departing from the scope of this disclosure.

Advantageously, the above-described embodiments of a mixed reality presentation system 10 and related method 800 provide a simple and intuitive paradigm that facilitates user engagement with a mixed reality environment 40. Feedback provided by a mixed reality device, such as HMD device 42, enables a user to easily navigate among virtual and physical objects in the mixed reality environment 40. Using a simple gesture, the user may cause the system to perform an operation on a selected object.

Figure 9:
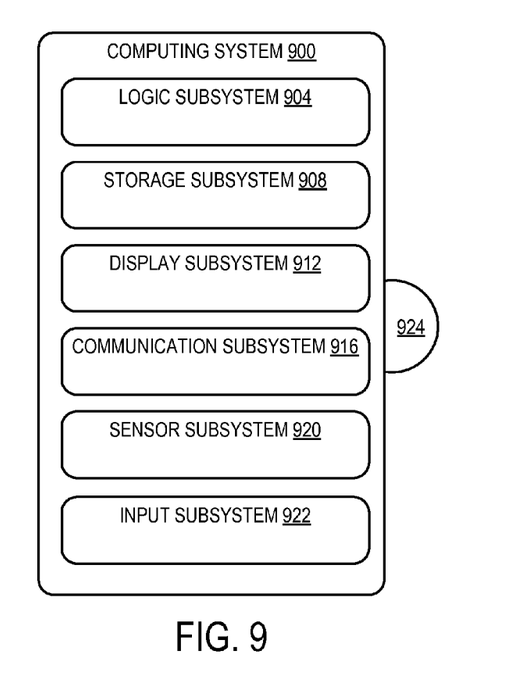
FIG. 9 is a simplified schematic illustration of an embodiment of a computing system.

FIG. 9 schematically shows a nonlimiting embodiment of a computing system 900 that may perform one or more of the above described methods and processes. Computing device 22 may take the form of computing system 900. Computing system 900 is shown in simplified form. It is to be understood that virtually any computer architecture may be used without departing from the scope of this disclosure. In different embodiments, computing system 900 may take the form of a mainframe computer, server computer, desktop computer, laptop computer, tablet computer, home entertainment computer, network computing device, mobile computing device, mobile communication device, gaming device, etc. As noted above, in some examples the computing system 900 may be integrated into an HMD device.

As shown in FIG. 9, computing system 900 includes a logic subsystem 904 and a storage subsystem 908. Computing system 900 may optionally include a display subsystem 912, a communication subsystem 916, a sensor subsystem 920, an input subsystem 922 and/or other subsystems and components not shown in FIG. 9. Computing system 900 may also include computer readable media, with the computer readable media including computer readable storage media and computer readable communication media. Computing system 900 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 904 may include one or more physical devices configured to execute one or more instructions. For example, the logic subsystem 904 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 904 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 908 may include one or more physical, persistent devices configured to hold data and/or instructions executable by the logic subsystem 904 to implement the herein described methods and processes. When such methods and processes are implemented, the state of storage subsystem 908 may be transformed (e.g., to hold different data).

Storage subsystem 908 may include removable media and/or built-in devices. Storage subsystem 908 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 908 may include devices with one or more of the following characteristics: volatile, nonvolatile, dynamic, static, read/write, read-only, random access, sequential access, location addressable, file addressable, and content addressable.

In some embodiments, aspects of logic subsystem 904 and storage subsystem 908 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 9 also shows an aspect of the storage subsystem 908 in the form of removable computer readable storage media 924, which may be used to store data and/or instructions executable to implement the methods and processes described herein. Removable computer-readable storage media 924 may take the form of CDs, DVDs, HD-DVDs, Blu-Ray Discs, EEPROMs, and/or floppy disks, among others.

It is to be appreciated that storage subsystem 908 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 912 may be used to present a visual representation of data held by storage subsystem 908. As the above described methods and processes change the data held by the storage subsystem 908, and thus transform the state of the storage subsystem, the state of the display subsystem 912 may likewise be transformed to visually represent changes in the underlying data. The display subsystem 912 may include one or more display devices utilizing virtually any type of technology. Such display devices may be combined with logic subsystem 904 and/or storage subsystem 908 in a shared enclosure, or such display devices may be peripheral display devices. The display subsystem 912 may include, for example, the display system 48 and transparent display 50 of the HMD device 42.

When included, communication subsystem 916 may be configured to communicatively couple computing system 900 with one or more networks and/or one or more other computing devices. Communication subsystem 916 may include wired and/or wireless communication devices compatible with one or more different communication protocols. As nonlimiting examples, the communication subsystem 916 may be configured for communication via a wireless telephone network, a wireless local area network, a wired local area network, a wireless wide area network, a wired wide area network, etc. In some embodiments, the communication subsystem may allow computing system 900 to send and/or receive messages to and/or from other devices via a network such as the Internet.

Sensor subsystem 920 may include one or more sensors configured to sense different physical phenomenon (e.g., visible light, infrared light, sound, acceleration, orientation, position, etc.) as described above. Sensor subsystem 920 may be configured to provide sensor data to logic subsystem 904, for example. As described above, such data may include eye-tracking information, image information, audio information, ambient lighting information, depth information, position information, motion information, user location information, and/or any other suitable sensor data that may be used to perform the methods and processes described above.

When included, input subsystem 922 may comprise or interface with one or more sensors or user-input devices such as a game controller, gesture input detection device, voice recognizer, inertial measurement unit, keyboard, mouse, or touch screen. In some embodiments, the input subsystem 922 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the mixed reality presentation system 10 that is implemented to perform one or more particular functions. In some cases, such a program may be instantiated via logic subsystem 904 executing instructions held by storage subsystem 908. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method, comprising:
   presenting a mixed reality environment via a head-mounted display device having a plurality of sensors including an outward facing optical sensor, the mixed reality environment occupying a spatial region;
   determining a head orientation of a user wearing the head-mounted display device based on head pose data from one or more of the sensors;
   defining a sub-region of the spatial region, the sub-region defined based on the head orientation of the user;
   generally identifying one or more gross selectable targets within the sub-region of the spatial region based at least on head pose data from one or more of the sensors and not based on eye-tracking data from one or more of the sensors, the one or more gross selectable targets within the sub-region displayed with a gross visual highlight, and one or more objects outside of the sub-region but within the spatial region not displayed with any visual highlight;
   after generally identifying the one or more gross selectable targets, then specifically identifying a first fine selectable target from among the gross selectable targets in response to identifying an intersection between a focal point of the user and the first fine selectable target based at least on the eye-tracking data from one or more of the sensors and not based on the head pose data;
   in response to identifying the first fine selectable target, displaying the first fine selectable target with a fine visual highlight;
   displaying an eye-tracking visual cue within the spatial region based on the eye-tracking data, the visual cue corresponding generally to a location of gaze;
   identifying a hand gesture based on gesture data from one or more of the sensors;
   performing a first operation associated with the identified hand gesture on the first fine selectable target;
   in response to performing the first operation associated with the identified hand gesture, changing the fine visual highlight to an activated visual highlight that is visually different from the fine visual highlight;
   specifically identifying a second fine selectable target from among the gross selectable targets based at least on the eye-tracking data from one or more of the sensors and not based on the head pose data;
   identifying the hand gesture based on gesture data from one or more of the sensors; and
   performing a second operation associated with the identified hand gesture on the second fine selectable target, the second operation being different from the first operation.

2. The method of claim 1, wherein the fine visual highlight is visually different from the gross visual highlight.

3. The method of claim 2, wherein the one or more gross selectable targets include one or more selectable physical objects and one or more selectable virtual objects.

4. The method of claim 1, wherein the eye-tracking visual cue is displayed at a distance from a focal point on the fine selectable target.

5. The method of claim 1, wherein the fine selectable target comprises a sub-target within one of the one or more gross selectable targets.

6. The method of claim 1, further comprising:
   identifying the one or more selectable physical objects via image data from one or more of the sensors.

7. The method of claim 1, wherein the gesture data corresponds to depth information, and further comprising receiving the depth information from a gesture target that is outside the sub-region of the spatial region.

8. A mixed reality presentation system, comprising:
   a head-mounted display device operatively connected to a computing device and having a plurality of sensors including an outward facing optical sensor and a display system for displaying a mixed reality environment that occupies a spatial region; and
   a mixed reality presentation program executed by a processor of the computing device, the mixed reality presentation program configured to:
   determine a head orientation of a user wearing the head-mounted display device based on head pose data from one or more of the sensors;
   define a sub-region of the spatial region, the sub-region defined based on the head orientation of the user;
   generally identify one or more gross selectable targets within the sub-region of the spatial region based at least on head pose data from one or more of the sensors and not based on eye-tracking from one or more of the sensors, the one or more gross selectable targets within the sub-region displayed with a gross visual highlight, and one or more objects outside of the sub-region but within the spatial region not displayed with any visual highlight;
   after generally identifying the one or more gross selectable targets, then specifically identify a first fine selectable target from among the gross selectable targets in response to identifying an intersection between a focal point of the user and the first fine selectable target based at least on the eye-tracking data from one or more of the sensors and not based on the head pose data;
   in response to identifying the first fine selectable target, display the first fine selectable target with a fine visual highlight;
   display an eye-tracking visual cue within the spatial region based on the eye-tracking data, the visual cue corresponding generally to a location of gaze;

identify a hand gesture based on gesture data from one or more of the sensors;

perform a first operation associated with the identified hand gesture on the first fine selectable target;

in response to performing the first operation associated with the identified hand gesture, change the fine visual highlight to an activated visual highlight that is visually different from the fine visual highlight;

specifically identify a second fine selectable target from among the gross selectable targets based at least on the eye-tracking data from one or more of the sensors and not based on the head pose data;

identify the hand gesture based on gesture data from one or more of the sensors; and perform a second operation associated with the identified hand gesture on the second fine selectable target, the second operation being different from the first operation.

9. The mixed reality presentation system of claim 8, wherein the fine visual highlight is visually different from the gross visual highlight.

10. The mixed reality presentation system of claim 9, wherein the one or more gross selectable targets include one or more selectable physical objects and one or more selectable virtual objects.

11. The mixed reality presentation system of claim 8, wherein the mixed reality presentation program is further configured to display the eye-tracking visual cue at a distance from a focal point on the fine selectable target.

12. The mixed reality presentation system of claim 8, wherein the fine selectable target comprises a sub-target within one of the one or more gross selectable targets.

13. The mixed reality presentation system of claim 8, wherein the mixed reality presentation program is further configured to:

identify the one or more selectable physical objects via image data from one or more of the sensors.

14. The mixed reality presentation system of claim 8, wherein the gesture data corresponds to depth information, and the mixed reality presentation program is further configured to receive the depth information from a gesture target that is outside the sub-region of the spatial region.

15. A mixed reality presentation system, comprising:

a head-mounted display device operatively connected to a computing device and having a plurality of sensors including an outward facing optical sensor and a display system for displaying a mixed reality environment that occupies a spatial region, and a mixed reality presentation program executed by a processor of the computing device, the mixed reality presentation program configured to:

determine a head orientation of a user wearing the head-mounted display device based on head pose data from one or more of the sensors;

define a sub-region of the spatial region, the sub-region defined based on the head orientation of the user;

generally identify one or more gross selectable targets within the sub-region of the spatial region based at least on head pose data from one or more of the sensors and not based on eye-tracking data from one or more of the sensors, the one or more gross selectable targets within the sub-region displayed with a gross visual highlight, and one or more objects outside of the sub-region but within the spatial region not displayed with any visual highlight;

after generally identifying the one or more gross selectable targets, then specifically identify a first fine selectable target from among the gross selectable targets in response to identifying an intersection between a focal point of the user and the first fine selectable target based at least on the eye-tracking data from one or more of the sensors and not based on the head post data;

display an eye-tracking visual cue within the spatial region based on the eye-tracking data, the visual cue corresponding generally to a location of gaze;

in response to identifying the first fine selectable target, display the first fine selectable target with a fine visual highlight that is visually different from the gross visual highlight;

identify a hand gesture based on gesture data from one or more of the sensors;

perform a first operation associated with the identified hand gesture on the first fine selectable target;

change the fine visual highlight to an activated visual highlight that is visually different from the fine visual highlight when the operation associated with the identified hand gesture is performed on the first fine selectable target;

specifically identify a second fine selectable target from among the gross selectable targets based at least on the eye-tracking data from one or more of the sensors and not based on the head pose data;

identify the hand gesture based on gesture data from one or more of the sensors; and perform a second operation associated with the identified hand gesture on the second fine selectable target, the second operation being different from the first operation.

16. The mixed reality presentation system of claim 15, wherein the one or more gross selectable targets include one or more selectable physical objects and one or more selectable virtual objects.

* * * * *

UNITED STATES PATENT AND TRADEMARK OFFICE
CERTIFICATE OF CORRECTION

PATENT NO. : 9,977,492 B2
APPLICATION NO. : 13/706814
DATED : May 22, 2018
INVENTOR(S) : Peter Tobias Kinnebrew et al.

Page 1 of 1

It is certified that error appears in the above-identified patent and that said Letters Patent is hereby corrected as shown below:

In the Claims

Claim 15 Column 14, Line 22, delete "head post data" and insert --head pose data--

Signed and Sealed this
Thirteenth Day of November, 2018

Andrei Iancu
*Director of the United States Patent and Trademark Office*